(12) United States Patent
Marples et al.

(10) Patent No.: US 11,868,735 B1
(45) Date of Patent: Jan. 9, 2024

(54) METHODS AND APPARATUS FOR ANALYZING INTERNAL COMMUNICATIONS WITHIN AN ORGANIZATION USING NATURAL LANGUAGE PROCESSING TO RECOMMEND IMPROVED INTERACTIONS AND IDENTIFY KEY PERSONNEL

(71) Applicant: iCIMS, Inc., Holmdel, NJ (US)

(72) Inventors: Ryan Marples, Vancouver (CA); Pratikkumar Maheshbhai Patel, Nutley, NJ (US); Alex Wong, Matawan, NJ (US); Jennifer Cafiero, Clark, NJ (US); Aaron D. Jeskie, Brick, NJ (US)

(73) Assignee: iCIMS, Inc., Holmdel, NJ (US)

( * ) Notice: Subject to any disclaimer, the term of this patent is extended or adjusted under 35 U.S.C. 154(b) by 0 days.

(21) Appl. No.: 17/932,156

(22) Filed: Sep. 14, 2022

(51) Int. Cl.
*G06F 40/35* (2020.01)
*G06Q 10/101* (2023.01)

(52) U.S. Cl.
CPC ........... *G06F 40/35* (2020.01); *G06Q 10/101* (2013.01)

(58) Field of Classification Search
CPC .............................. G06F 40/35; G06Q 10/101
See application file for complete search history.

(56) References Cited

U.S. PATENT DOCUMENTS

| | | | |
|---|---|---|---|
| 7,519,542 B1 * | 4/2009 | Waingold | G06Q 10/10 705/7.11 |
| 10,346,444 B1 * | 7/2019 | Heitman | G06Q 10/107 |
| 10,402,465 B1 * | 9/2019 | Jain | H04L 67/535 |
| 10,949,618 B2 * | 3/2021 | Zhou | G06N 5/022 |
| 11,409,820 B1 * | 8/2022 | Gutierrez | G06F 16/9538 |
| 11,423,018 B1 * | 8/2022 | Paiz | G06F 16/243 |
| 11,544,800 B1 * | 1/2023 | Bell | G06F 40/30 |
| 2007/0094327 A1 | 4/2007 | Ito et al. | |
| 2018/0115603 A1 * | 4/2018 | Hu | G06Q 50/01 |
| 2019/0361934 A1 * | 11/2019 | Rogynskyy | G06F 21/6218 |
| 2020/0042928 A1 | 2/2020 | Kim et al. | |
| 2020/0412831 A1 | 12/2020 | Harrison et al. | |
| 2022/0067741 A1 * | 3/2022 | Benkreira | G06Q 20/321 |
| 2022/0300559 A1 * | 9/2022 | Kamm | G06F 16/9024 |
| 2023/0103076 A1 * | 3/2023 | Zhou | G06F 16/31 726/1 |

* cited by examiner

*Primary Examiner* — Anne L Thomas-Homescu
(74) *Attorney, Agent, or Firm* — Cooley LLP

(57) ABSTRACT

In an embodiment, communication data including an interaction between at least two individuals in an organization is received via at least two communication platforms. Content of the interaction is extracted to produce extracted content. A frequency of interaction and a type of interaction between the at least two individuals is determined based on the extracted content. A map representative of social interaction within the organization is generated. The map includes an indication of the frequency of interaction and the type of interaction between the at least two individuals. A new frequency of the interaction and a new type of interaction for at least a first individual of the at least two individuals with another individual is determined based on the map. A signal representing the new frequency of interaction and the new type of interaction with the other individual in the organization is provided to a compute device.

20 Claims, 6 Drawing Sheets

METHODS AND APPARATUS FOR ANALYZING INTERNAL COMMUNICATIONS WITHIN AN ORGANIZATION USING NATURAL LANGUAGE PROCESSING TO RECOMMEND IMPROVED INTERACTIONS AND IDENTIFY KEY PERSONNEL

TECHNICAL FIELD

The present disclosure relates to the field of data processing and natural language processing including, for example, methods and apparatus for recommending improved interactions and identifying key personnel in an organization.

BACKGROUND

In the recent past, most organizations have focused on programs and policies to encourage representation and participation of diverse groups of people, including people of different genders, races, ethnicities, abilities, religions, cultures, ages, sexual orientations and people with diverse backgrounds, experiences, skills, and expertise. Diversity, Equity, and Inclusion (DEI) initiatives are designed to create and maintain a successful workplace. As a part of DEI initiatives, most organizations conduct workshops and training, publicize job postings to a targeted diverse group of people, and encourage promotion of individuals belonging to diversity groups. Unfortunately, such DEI initiatives typically have not led to tangible results.

An element in the development of an individual's career within an organization is the level of the individual's social capital—i.e., the network of relationships (professional and personal) within that organization that can help lead to the individual's next opportunity to move up and/or around the organization. Unfortunately, historically-excluded groups often have a larger than average gap in social capital, thereby hindering their professional growth. Analyzing social capital of individuals within an organization manually can be extremely cumbersome and time consuming, and in some scenarios nearly impossible (e.g., if the organization is large with hundreds or thousands of individuals/employees).

Accordingly, an unmet need exists for automatically analyzing the social capital of individuals within an organization reliably and in a time efficient manner and for providing recommendations to enhance the social capital and professional expertise of individuals within an organization irrespective of the groups that the individuals belong to.

SUMMARY

In an embodiment, communication data including an interaction between at least two individuals in an organization is received via at least two communication platforms. Content of the interaction between the at least two individuals from the communication data is extracted, via a processor and using natural language processing, to produce extracted content. A frequency of interaction and a type of interaction between the at least two individuals is determined, via the processor, based on the extracted content. A map representative of social interaction within the organization is generated via the processor. The map includes an indication of the frequency of interaction and the type of interaction between the at least two individuals. A new frequency of the interaction and a new type of interaction for at least a first individual of the at least two individuals with another individual in the organization is determined, via the processor, based on the map. A signal representing the new frequency of interaction and the new type of interaction with the other individual in the organization is provided to a compute device.

In an embodiment, a non-transitory processor-readable medium stores code representing instructions to be executed by a processor of a first compute device. The code comprises code to cause the processor to receive a representation of a structure of an organization. The representation includes an associated position and an associated rank of each employee relative to each remaining employee included in the representation of the structure of the organization. For each employee included in the representation of the structure of the organization, the code includes code to cause the processor to (1) receive, via at least one communication platform, communication data including interactions between that employee and at least one other remaining employee included in the representation of the structure of the organization, (2) analyze the communication data based at least in part on the associated position and the associated rank of that employee and the associated position and the associated rank of the at least other remaining employee, and (3) assess a quality of social network of that employee based on the analysis. The code further comprises code to cause the processor to send, to a compute device of that employee, a signal representing a recommendation for interaction between that employee and at least one remaining employee included in the representation of the structure of the organization based on the quality of the social network of that employee.

In an embodiment, communication data including an interaction between at least a first individual in an organization and a second individual in the organization is received via a communication platform. Content of the interaction between at least the first individual and the second individual from the communication data is extracted via a processor and using natural language processing. A context within the content is determined via the processor. The context is representative of a topic of discussion between the first individual and the second individual. A professional expertise of the first individual in the organization is identified, via the processor, based on the context.

DETAILED DESCRIPTION

Figure 1:
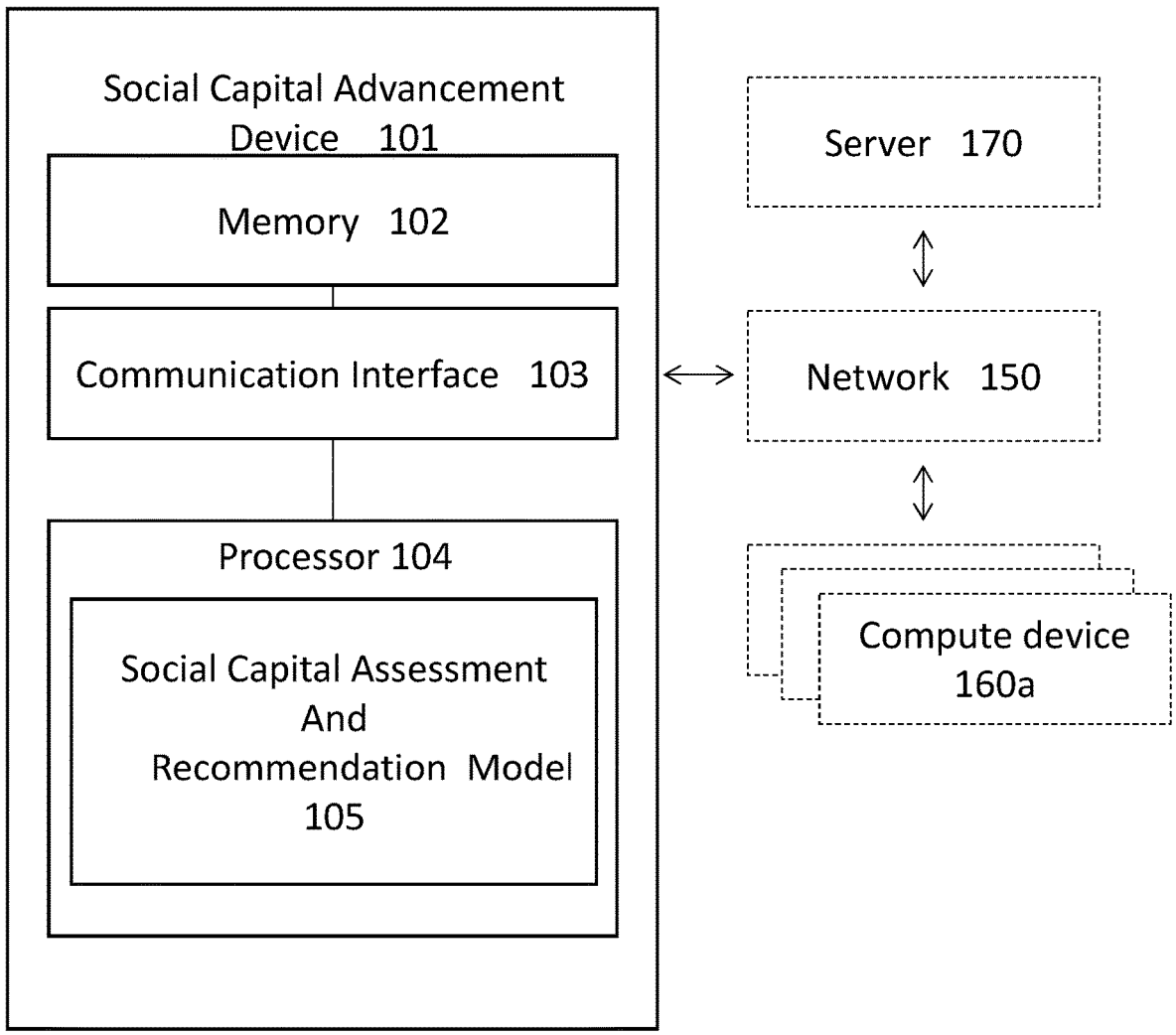
FIG. 1 is a schematic description of a social capital advancement device, according to an embodiment.

Non-limiting examples of various aspects and variations of the embodiments are described herein and illustrated in the accompanying drawings.

One or more embodiments described herein relate to apparatus and methods for collecting internal social interactions within an organization and for providing recommendations to enhance an individual's social capital in a reliable, efficient, and automatic manner. In some embodiments, the technology described herein can also identify key personnel in an organization and/or can identify professional expertise, skills, and knowledge of individuals within the organization.

As used herein, the term "social capital" can refer to the network of relationships within an organization that can help an individual with an opportunity to move up and/or around within the organization, thereby augmenting the individual's possibility of success. As used herein, the terms "automatic," and/or "automatically," can refer to apparatus and methods (e.g., apparatus and methods for collecting social interactions and providing recommendations as described herein) that perform one or more tasks (e.g., assessing social capital, identifying professional expertise, skill, and knowledge, etc.) with minimal or no human interaction and/or input from humans. As used herein, the term "individual" can refer to an employee of an organization.

Generally, the level of social capital of an individual within an organization can be an indicator of the possibility of potential professional success that the individual can achieve. To analyze the social capital of individuals within an organization, the technology described herein can collect digital interactions between different individuals within the organization. The data collected and extracted from these digital interactions can be analyzed (assessed) to recommend new interactions so that individuals can grow their social capital to improve future advancement within the organization. Such assessment can also provide insights about the quality of an individual's social capital and professional expertise and skills of individuals within the organization. This in turn can be helpful to bridge gaps in an individual's social capital and can eliminate duplication of work within the organization. In this manner, the technology described herein can benefit both the organization and the individuals within the organization.

The collection of the digital interactions (also referred to herein as "communications data") mentioned above can be a significant challenge as the volume of such digital interactions increases with the number of individuals within an organization increasing. In other words, as the number of individuals within an organization increases (e.g., hundreds, thousands, tens of thousands, etc.), the increase in the number of digital interactions happens in non-linear manner, resulting in a very high number of digital interactions (e.g., millions, hundreds of millions, etc.) that cannot be analyzed manually or without a computer system as described herein. Moreover, the analysis of such digital interactions to produce a recommendation(s) to improve the social capital of an individual(s) and/or to identity key individuals within the organization is more effective when more digital interactions are analyzed, and most effective when all digital interactions are analyzed.

In some embodiments, a social capital advancement device (e.g., social capital advancement device 101 described herein in relation with FIG. 1) can collect digital interactions, extract data from the digital interactions, assess social capital, and provide recommendations and/or insights in an automatic manner.

FIG. 1 is a schematic description of a social capital advancement device 101, according to some embodiments. The social capital advancement device 101 can be optionally coupled to one or more compute devices, such as for example, compute device 160a, compute device, 160b, etc. (e.g., collectively referred to as compute device(s) 160) and/or a server 170. The server 170 and/or the compute device(s) 160 can transmit digital interactions and/or receive recommendations and/or insights from the social capital advancement device 101 via a network 150. The social capital advancement device 101 can be a compute device that includes a memory 102, a communication interface 103, and a processor 104. The social capital advancement device 101 can operate a social capital assessment and recommendation model 105, which can evaluate social capital of individuals within an organization and provide insights and/or recommendations based on the evaluation.

In some implementations, the social capital advancement device 101 can be a compute device such as for example, computers (e.g., desktops, personal computers, laptops etc.), tablets and e-readers (e.g., Apple iPad®, Samsung Galaxy® Tab, Microsoft Surface®, Amazon Kindle®, etc.), mobile devices and smart phones (e.g., Apple iPhone®, Samsung Galaxy®, Google Pixel®, etc.), etc. In some implementations, the social capital advancement device 101 can be a server that includes a compute device medium such as a processor-readable medium such as a memory that stores instructions to be executed by a processor. In some implementations, the social capital advancement device 101 can include one or more processors running on a cloud platform (e.g., Microsoft Azure®, Amazon® web services, IBM® cloud computing, etc.).

To operate the social capital assessment and recommendation model 105, the social capital advancement device 101 receives digital interactions (or representations/indications of digital interactions) between individuals (e.g., between two individuals) via the communications interface 103. One or more individuals within an organization can communicate with other individuals within the organization via a plurality of communication methodologies, referred to herein as "communication platforms." Examples of communication platforms include, but are not limited to, a chat-client (e.g., Slack™, Hipchat®, Google Chat™, Microsoft Teams™ etc.), social media platforms (e.g., LinkedIn™, Meta™, etc.), email, SMS, a combination thereof, and/or the like. In some embodiments, the communication platforms can interface with the one or more compute device(s) 160 and/or the server 170. The server 170 and/or the compute device(s) 160 can receive the communications (e.g., digital interactions) between individuals in the organization via the communication interface 103. The communications (e.g., digital interactions) between individuals in the organization can then be transmitted to the social capital advancement device 101 via the compute device(s) 160 and/or the server 170. Additionally or alternatively, the communication platforms can interface directly with the social capital advancement device 101, such as for example, via communication interface 103. The communications (e.g., digital interactions) between individuals in the organization can be transmitted to the social capital advancement device 101 directly from the communication platforms via communication interface 103.

The processor 104 can be any suitable processing device configured to run and/or execute a set of instructions or code, and may include one or more data processors, image processors, graphics processing units, digital signal processors, and/or central processing units. The processor 104 may be, for example, a general purpose processor, a Field Programmable Gate Array (FPGA), an Application Specific Integrated Circuit (ASIC), and/or the like. The processor 104 can include the social capital assessment and recommendation model 105. In some implementations, the processor 104 can be configured to execute and/or implement the social capital assessment and recommendation model 105. The social capital assessment and recommendation model 105, when executed by the processor 104, can extract content of interaction from the communication data, process the content, analyze the content, and/or provide a recommendation(s) and/or an insight(s).

The social capital assessment and recommendation model 105 can receive the digital interaction and/or communication data via the communication interface 103. As discussed above, the communication data can be received from one or more types of a communication platform(s). In particular, the communication data can be received from different communication platforms in different formats (e.g., protocols). The social capital assessment and recommendation model 105 can extract the content of interaction from the communication data (despite the format in which the communication data is received) and can process the content such that the processed data can be used to identify insights and recommendations. In some embodiments, the processed data can be used to train and/or update the social capital assessment and recommendation model 105. In this manner, the social capital assessment and recommendation model 105 can adapt and improve continuously.

Some non-limiting examples of the compute device 160 include computers (e.g., desktops, personal computers, laptops etc.), tablets and e-readers (e.g., Apple iPad®, Samsung Galaxy® Tab, Microsoft Surface®, Amazon Kindle®, etc.), mobile devices and smart phones (e.g., Apple iPhone®, Samsung Galaxy®, Google Pixel®, etc.), etc. In some implementations, the server 170 can be/include a compute device medium particularly suitable for data storage purpose and/or data processing purpose. The server 170 can include a memory, a communication interface and/or a processor. In some embodiments, the server 170 can include one or more processors running on a cloud platform (e.g., Microsoft Azure®, Amazon® web services, IBM® cloud computing, etc.). The server 170 may be any suitable processing device configured to run and/or execute a set of instructions or code, and may include one or more data processors, image processors, graphics processing units, digital signal processors, and/or central processing units. The server 170 may be, for example, a general purpose processor, a Field Programmable Gate Array (FPGA), an Application Specific Integrated Circuit (ASIC), and/or the like.

In some embodiments, the memory 102 can store interaction content, modified interaction content (e.g., as discussed below with reference to FIG. 2), insights, recommendations, graphs, maps, a combination thereof, and/or the like. The memory 102 can be, for example, a memory buffer, a random-access memory (RAM), a read-only memory (ROM), a hard drive, a flash drive, and/or the like. In some embodiments, the memory 102 can store instructions to operate the social capital assessment and recommendation model 105. For example, the memory 102 can store software code including modules, functions, variables, etc. to operate the social capital assessment and recommendation model 105. In some embodiments, the results from the social capital assessment and recommendation model 105 (e.g., recommendations, weighted scores, insights, graphs, maps, etc.) can be stored in the memory 102.

The memory 102 can be operatively coupled to the communications interface 103. Additionally or alternatively, the communications interface 103 can be operatively coupled to the processor 104. The communications interface 103 can facilitate data communication between the candidate evaluation device 101 and external devices (e.g., the network 150, the compute device 160, the server 170, etc.).

The communications interface 103 can be, for example, a network interface card (NIC), a Wi-Fi® transceiver, a Bluetooth® transceiver, an optical communication module, and/or any other suitable wired and/or wireless communication interface. In some embodiments, the communications interface 103 can facilitate transfer of and/or receiving of digital interaction, data associated with the social capital assessment and recommendation model 105, output of the social capital assessment and recommendation model 105 to and/or from the external devices via the network 150.

The network 150 can be, for example, a digital telecommunication network of servers and/or compute devices. The servers and/or compute devices on the network can be connected via one or more wired or wireless communication networks (not shown) to share resources such as, for example, data storage and/or computing power. The wired or wireless communication networks between servers and/or compute devices of the network 150 can include one or more communication channels, for example, a radio frequency (RF) communication channel(s), a fiber optic commination channel(s), an electronic communication channel(s), and/or the like. The network 150 can be and/or include, for example, the Internet, an intranet, a local area network (LAN), and/or the like.

Figure 2:
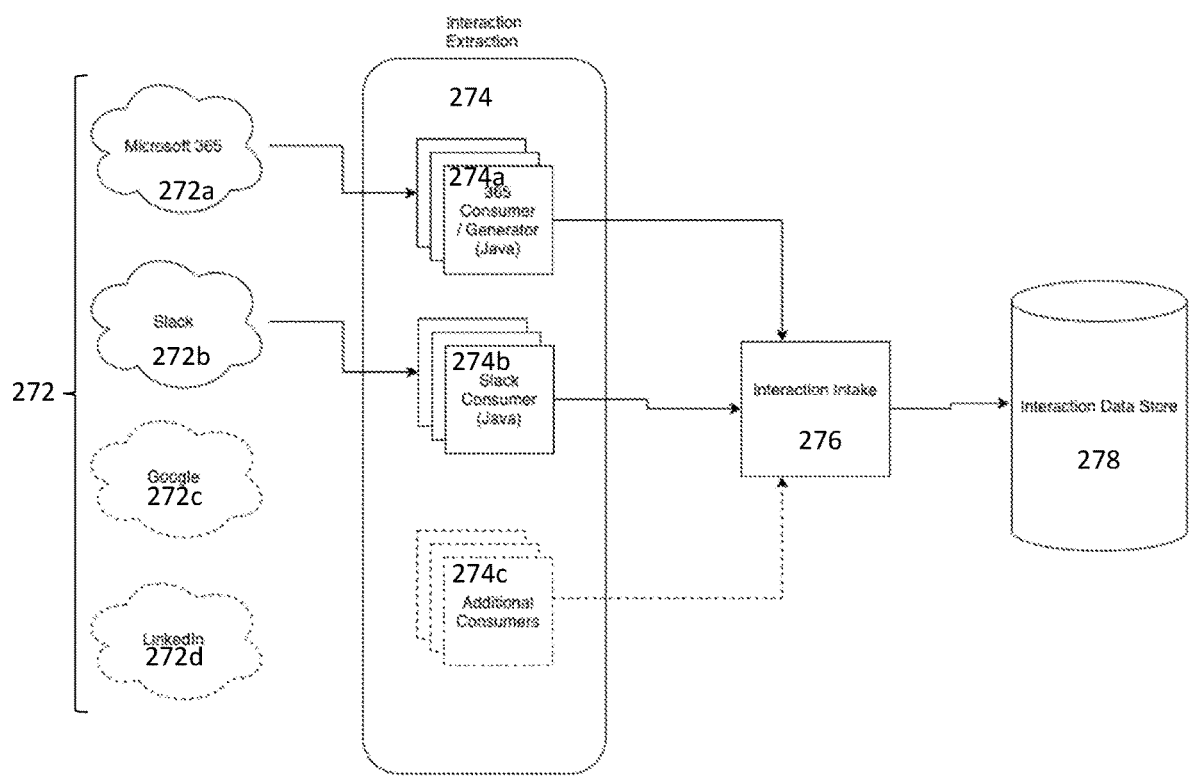
FIG. 2 depicts an example schematic illustration of extracting the content using the social capital assessment and recommendation model.

FIG. 2 depicts an example schematic illustration of extracting the content using the social capital assessment and recommendation model 105. As seen in FIG. 2, communication data can be received from different communication platforms such as Microsoft Teams™ 272a, Slack™ 272b, Google Chat™ 272c, and LinkedIn™ 272d. Communication data from each of these different communication platforms can be in different formats.

In some embodiments, the social capital assessment and recommendation model 105 can include a module such as interaction extraction module 274 to extract content from the communication data. The interaction extraction module 274 can include one or more application interfaces to interface with the different communication platforms. For example, the interaction extraction module 274 can include a 365 generator interface 274a to interface with Microsoft Teams™ 272a. The 365 generator interface 274a can extract content from communication data received from Microsoft Teams™ 272a. Similarly, the interaction extraction module 274 can include a Slack™ generator interface 274b to interface with Slack™ 272b. The Slack™ generator interface 274b can extract content from communication data received from Slack™ 272b. Similarly, the interaction extraction module 274 can include additional consumer interfaces 274c to interface with for example Google Chat™ 272c and LinkedIn™ 272d. The consumer interfaces 274c can extract content from communication data received from for example Google Chat™ 272c and LinkedIn™ 272d.

After the content has been extracted, an interaction intake module 276 included in the social capital assessment and recommendation model 105 can process the content to identify insights and recommendations. In some implementations, the interaction intake module 276 can implement natural language processing techniques to identify a context within the extracted content. For example, the context can include whether the digital interaction between the individuals is personal or professional. For instance, the interaction intake module 276 can process the extracted content to identify whether the extracted content includes a representation of visual in-line content such an emoticon(s), an emoji(s), a glyph(s), a giphy(ies), a video, etc. Depending on the presence, number and/or nature of the representation of visual in-line content, the interaction intake module 276 can identify whether the digital interaction is personal or professional. For example, if the extracted content includes multiple emoticons, emojis, glyphs and/or giphies indicating that the individuals interacting primarily have a personal relationship (e.g., use of multiple casual emojis such as multiple instances of a wink face emoji), then the interaction intake module 276 identifies the digital interaction as personal. Similarly, if the extracted content includes no emoticons/emojis or a few emoticons/emojis indicating that the individuals interacting primarily have a professional relationship, then the interaction intake module 276 identifies the digital interaction as professional. Additionally or alternatively, the context can include specificity about the discussion between the individuals such as, for example, topics (e.g., knowledge, skillsets, professional expertise, etc.) discussed between the individuals during the digital interaction. For example, if the extracted content includes multiple references to "Java," then the context can be identified as including professional expertise in "Java."

After identifying a context, in some implementations, the interaction intake module 276 can identify associative markers that associate the extracted content to the context. For instance, an associative marker "personal" may be indicate that the extracted content from the digital interaction includes a personal interaction. Similarly, an associative marker "professional" may indicate that the extracted content from the digital interaction includes a professional interaction. The interaction intake module 276 can add modifiers to the extracted content to associate the associative markers with the extracted content. For example, if the associative marker "personal" is identified for an extracted content, then the interaction intake module 276 can add a modifier "+personal" to the extracted content. In a similar manner, if the associative marker "professional" is identified for an extracted content, then the interaction intake module 276 can add a modifier "+professional" to the extracted content. The modified extracted content can then be stored in a data store 278. Referring back to FIG. 1, in some embodiments, the server 170 can include the data store 278. In some embodiments, the memory 102 can include the data store 278. This modified extracted content can be used to train and/or update the social capital assessment and recommendation model 105. In some embodiments, the modified extracted content can be used to provide recommendations and insights as further described below.

To provide recommendations and insights, in some embodiments, the social capital assessment and recommendation model 105 can be configured to determine a quality and/or nature of relationship between two individuals. As discussed above, the social capital assessment and recommendation model 105 (e.g., interaction intake module 276 in FIG. 2) can identify the nature of a relationship (e.g., personal or professional) between two individuals (e.g., by extracting content from communication data and identifying context). Relationships, however, tend to change over time. To account for such changes, in addition to identifying the nature of relationship at a given time, the social capital assessment and recommendation model 105 can also identify shifts in the relationship over time (e.g., from professional to personal).

For example, the social capital assessment and recommendation model 105 can be configured to split the communication data into temporal slices. Each temporal slice can include communication data received from the communication platform(s) during a specific timeframe. For example, if communication data between two individuals is received between time $t_1$ and time $t_4$, as a non-limiting example, the communication data can be split into three temporal slices such that a first temporal slice includes communication data received between time $t_1$ and time $t_2$, a second temporal slice includes communication data received between time $t_2$ and time $t_3$, and a third temporal slice includes communication data received between time $t_3$ and time $t_4$. The social capital assessment and recommendation model 105 can be configured to assign a score representative of the professional relationship between the two individuals for each temporal slice.

For instance, as discussed above, the social capital assessment and recommendation model 105 can be configured to identify context from the extracted content of the communication data for each interaction within each temporal slice. Based on the identified context, the social capital assessment and recommendation model 105 can be configured to assign a score representative of the professional relationship. For example, if a specific temporal slice includes 4 interactions, and the social capital assessment and recommendation model 105 identifies that 3 out of the 4 interactions were personal, then the social capital assessment and recommendation model 105 can assign a score of 3 for personal interactions, and a score of 1 for professional interactions. After assigning the scores for each temporal slice, the social capital assessment and recommendation model 105 can compare the scores of two consecutive temporal slices to determine a shift in the relationship.

Figure 3:
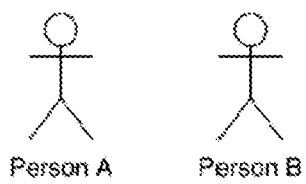
FIG. 3 depicts an example to illustrate identifying a shift in relationship between two individuals, according to an embodiment.

FIG. 3 depicts an example to illustrate identifying a shift in relationship between two individuals, according to some embodiments. In FIG. 3, the communication data between two individuals "Person A" and "Person B" is split into three temporal slices "slice 1," "slice 2," and "slice 3." In the first temporal slice "slice 1," the two individuals do not interact. Accordingly, the social capital assessment and recommendation model 105 assigns a score of 0 for professional interactions and a score of 0 for personal interactions in this slice. In the second temporal slice "slice 2," the two individuals interact 50 times. Out of these 50 interactions, the social capital assessment and recommendation model 105 determines that 47 of the interactions are professional. Accordingly, the social capital assessment and recommendation model 105 assigns a score of 47 for professional interactions and a score of 3 for personal interactions. The social capital assessment and recommendation model 105 can then determine a delta (e.g., based on comparing the scores of "slice 1" and "slice 2") between the two temporal slices. For example, the social capital assessment and recommendation model 105 can determine a difference between the score for professional interactions between the two slices. In a similar manner, the social capital assessment and recommendation model 105 can determine a difference between the score for personal interactions between the two slices. As seen in FIG. 3, the delta is +47 for professional interactions and +3 for personal interactions since there were no interactions in "slice 1."

As seen in FIG. 3, in the third temporal slice "slice 3," the two individuals interact 100 times. Out of these 100 interactions, the social capital assessment and recommendation model 105 determines that 40 of the interactions are professional. Accordingly, the social capital assessment and recommendation model 105 assigns a score of 40 for professional interactions and a score of 60 for personal interactions. The social capital assessment and recommendation model 105 can then determine a delta (e.g., based on comparing the scores of "slice 2" and "slice 3") between the two temporal slices. As seen in FIG. 3, the delta is −7 for professional interactions (e.g., difference between 47 professional interactions in "slice 2" and 40 professional interactions in "slice 3") and +57 for personal interactions (e.g., difference between 3 professional interactions in "slice 2" and 60 professional interactions in "slice 3"). Therefore, in FIG. 3, the relationship between "Person A" and "Person B" shifts from no interaction in "slice 1" to a professional interaction in "slice 2" to a personal interaction in "slice 3."

In this manner, a nature/type and shift over time in the nature of relationship between two individuals can be determined. Such determinations can be used to generate a map to identify a quality of an individual's social capital. For example, the social capital assessment and recommendation model 105 can generate a map that represents frequency of interaction and nature of interaction between individuals in an organization. In some embodiments, such a map can be dynamic. For example, the map can dynamically change as interaction between individuals in the organization change and the nature of relationship between individuals shift in the organization. The map can be a dynamic map that represents interactions between individuals, nature of interactions, frequency of interactions, and shift in interactions during a specific timeframe. This map can then be used to identify a new frequency and/or a new nature of interaction to bridge the social capital gap. For example, if the map shows that a first person in the team has lesser interactions with the manager of the team as opposed to other individuals on the team, then the social capital assessment and recommendation model 105 can provide recommendations to the first person to increase their interactions with the manager and/or recommendations to the manager to increase their interactions with the first person. Additionally or alternatively, the map can be used to assess if two individuals within the organization are working as a team or whether their relationship is strictly professional. The map can also be used to identify which two or more individuals are best suited to be working together. In this manner, the social capital assessment and recommendation model 105 can determine a quality of social capital for every individual within the organization and can provide recommendations to enhance the social capital. Such recommendations, assessment, and/or insights can be transmitted from the social capital assessment and recommendation model 105 to the compute device 160 or server 170 where the map and/or the recommendations, assessment, and/or insights are displayed.

To provide recommendations and insights, in some implementations, the social capital assessment and recommendation model 105 can be configured to determine a weighted score for each individual in the organization. The weighted score can be, for example, representative of the professional weight of every other individual of the organization in an individual's social capital. In some implementations, such weighted score/professional weight can be used to assess the quality of an individual's social capital. Additionally or alternatively, such weighted score/professional weight can be used to determine new interactions for the individual to increase (improve) the individual's professional growth. Such assessment of social capital (e.g., based on the weighted score) and the recommendations of new interactions can be transmitted from the social capital assessment and recommendation model 105 to the compute device 160 or server 170 where the weighted score and/or the recommendations are displayed.

In some implementations, to determine the weighted score, the social capital assessment and recommendation model 105 can receive a representation of a structure of the organization. The representation can include some or all the individuals of the organization. In some embodiments, the representation can include a position and a rank (e.g., hierarchical level within the organization) of each individual with respect to each other individual in the representation of the structure. For example, the representation may depict the position of a CEO as above a product manager within the organization. In some implementations, such a representation can be a hierarchical tree structure with root nodes and leaf nodes.

Figure 4:
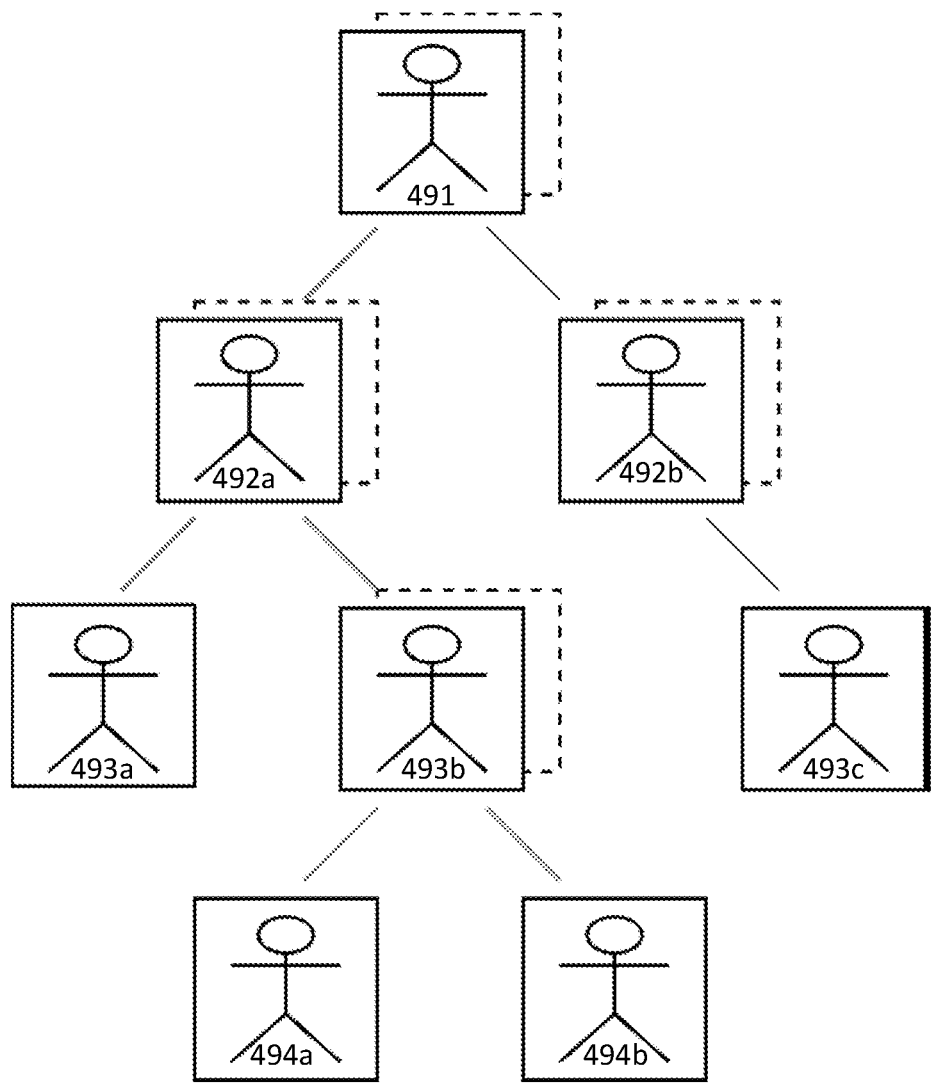
FIG. 4 depicts an example of a hierarchical tree structure of an organization, according to an embodiment.

FIG. 4 depicts an example of a hierarchical tree structure of an organization, according to some embodiments. The hierarchical tree structure can include nodes each of which represents an individual (e.g., employee) within an organization. The hierarchical tree structure can include a node(s) that is a root node, such as for example, node 491. The hierarchical tree structure can also include nodes that are only leaf nodes, such as for example, node 493a, node 493c, node 494a, and node 494b. Node 492a, node 492b, and node 493b are each an internal node within the hierarchical tree structure. In some implementations, a team within the organization can be formed (defined) by a portion of the hierarchical tree. For example, internal node 493b can be a supervisor of a team that includes two employees represented by node 494a and node 494b. Similarly, internal node 492b can be a supervisor of a team that includes one employee represented by node 493c. Similarly, internal node 492a can be a supervisor of a team that includes employees represented by node 493a, node 493b, node 494a, and node 494b. Similarly, root node 491 can be a supervisor (e.g., a department head or the chief executive office of the organization) of a team that includes employees represented by node 492a, node 492b, node 493a, node 493b, node 493c, node 494a, and node 494b. In yet another example, a team can include executives or managers of an organization and not other employees of the organization, such as team that includes the executives/managers represented by node 491, node 492a, node 492b and node 493b.

To determine the weighted score, the social capital assessment and recommendation model 105 can first determine a first matrix (e.g., a communication frequency matrix) representing a frequency of communication for each individual with each remaining individual included in the representation (e.g., hierarchical tree structure in FIG. 4) of the structure of the organization. This can be a cumulative count of all interactions (e.g., via one or more communication platforms) between each individual and each remaining individual of the organization. The social capital assessment and recommendation model 105 can then determine a second matrix (e.g., a hierarchical level communication frequency matrix) representing a frequency of communication for each individual with each remaining individual within a team in the representation (e.g., hierarchical tree structure in FIG. 4) of the structure of the organization in the context of different hierarchal levels within the hierarchical tree structure. For example, in FIG. 4, a hierarchical level communication frequency matrix can represent a frequency of communication for node 494a with node 494b and with node 493b.

The social capital assessment and recommendation model 105 can then determine a third matrix (e.g., relative frequency matrix) based on the first matrix (e.g., a communication frequency matrix) and the second matrix (e.g., a hierarchical level communication frequency matrix). For example, the relative frequency matrix can be a sum of the communication frequency matrix and the hierarchical level communication frequency matrix. In some embodiments, the social capital assessment and recommendation model 105 can normalize the relative frequency matrix (e.g., values ranging from 0 to 1). Such a matrix can be representative of the relative frequency of communication between teams.

In some implementations, the social capital assessment and recommendation model 105 can assign a seniority value (also referred to herein as a "seniority score") to each person in the representation of the structure (e.g., hierarchical tree structure in FIG. 4). For example, a root node (e.g., node 491 in FIG. 1) can be assigned a seniority value of 1. Such a node may be representative, for example, of the chief executive office of the organization. The seniority value can be smaller for node lower/away from this root node. For example, the seniority value can be smaller depending on how far away a node is from this root node that was assigned a seniority value of 1 (e.g., node 491 in FIG. 1). For example, the seniority value can be determined based on a logarithmic decay function, such as for example, Seniority (node)=1−log (d), where d represents the number of degrees away from the senior most root node (e.g., with seniority value of 1 such as node 491 in FIG. 4).

In some embodiments, the social capital assessment and recommendation model 105 can determine a common collaborator. For example, the social capital assessment and recommendation model 105 can define a common collaborator function. The common collaborator function can assess the potential positive impact of communications between individuals within an organization. For example, communications between a marketing department and a sales department are typically somewhat common and thus additional communications and/or a new relationship (or relationship type) between an individual in the marketing department and an individual in the sales department are less impactful than additional communications and/or a new relationship (or relationship type) between an individual in the product management department and an individual in the finance department.

The social capital assessment and recommendation model 105 can define the common collaborator function for a given originating individual and a relative individual within the organization. For example, as discussed above, a matrix (e.g., a communication frequency matrix) representing a frequency of communication for each individual with each remaining individual included in the representation (e.g., hierarchical tree structure in FIG. 4) of the structure of the organization can be determined. Then the social capital assessment and recommendation model 105 can define a common collaborator function based on this matrix and the actual communications between the original individual and the relative individual. Thus, the common collaborator function will provide a higher weighting a relationship between two individuals within an organization when the matrix indicates a lower connectiveness between the teams associated with each of the originating individual and the relative individual and based on the frequency and/or relationship type for communications between the originating individual and the relative individual.

The final weighted score of an individual relative to an originating individual can be determined as:

$$\text{weight(person,originator)}=(1-\text{collaborator score (originator,person)})*(1+\text{seniority(person)})$$

In some embodiments, the final weighted score can be used to assess the quality of an individual's social network.

To provide recommendations and insights, in some implementations, the social capital assessment and recommendation model 105 can determine the professional expertise and skillset of individuals within the organization. In large organizations with several individuals (e.g., hundreds of individuals, thousands of individuals, or even tens of thousands of individuals), it can be difficult to identify knowledge/skillsets of individuals. Specifically, in most large organizations, knowledge among individuals can be largely hidden unless the individuals actively advertise their expertise on a particular subject. In such a scenario, it could be possible that multiple individuals with the same expertise duplicate work because they are in different parts of the organization (e.g., not actively interacting with each other or in the same team). Accordingly, identifying knowledge, expertise, and/or skillsets of individuals within the organization can for example eliminate duplication of work.

To identify knowledge, expertise, and skillsets, the social capital assessment and recommendation model 105 can determine a score (e.g., a knowledge score, an expertise score or a skillsets score). The score can be based on a context that may be representative of a specific knowledge, expertise, and/or skillset. For example, the score can be based on the volume of interactions within a context, and temporal distance between two successive interactions that include that context. For instance, if a first interaction includes Java-related content, and a third interaction (after a second interaction) also includes Java-related content, then the score for determining Java expertise of the individual can take into account the temporal distance between the first interaction and the third interaction. This temporal distance can work as a scale to measure degrading memory over the time between a current interaction and a last interaction including content with the same given context. Accordingly, the score can be represented for example as: Expertise Score=(volume of interactions within context)−(1−((0.1*time factor)∥1)).

In some implementations, this expertise score can be used to generate a graph of weighted vertices based on a topic (e.g., expertise, knowledge, and/or skillset). The social capital assessment and recommendation model 105 can use the graph to determine the most influential individuals within a given topic. In some implementations, the vertices of the graph can be joined based on certain criteria to isolate and identify the pools of knowledge. For example, a criteria can be selected by the social capital assessment and recommendation model 105 (or through user input to the social capital assessment and recommendation model 105) such an expertise in Java. Then, a graph can be defined where the vertices of the graph (representing individuals in the organization having a particular level of expertise, here in Java) are joined (e.g., fully interconnected).

Figures 5A, 5B:
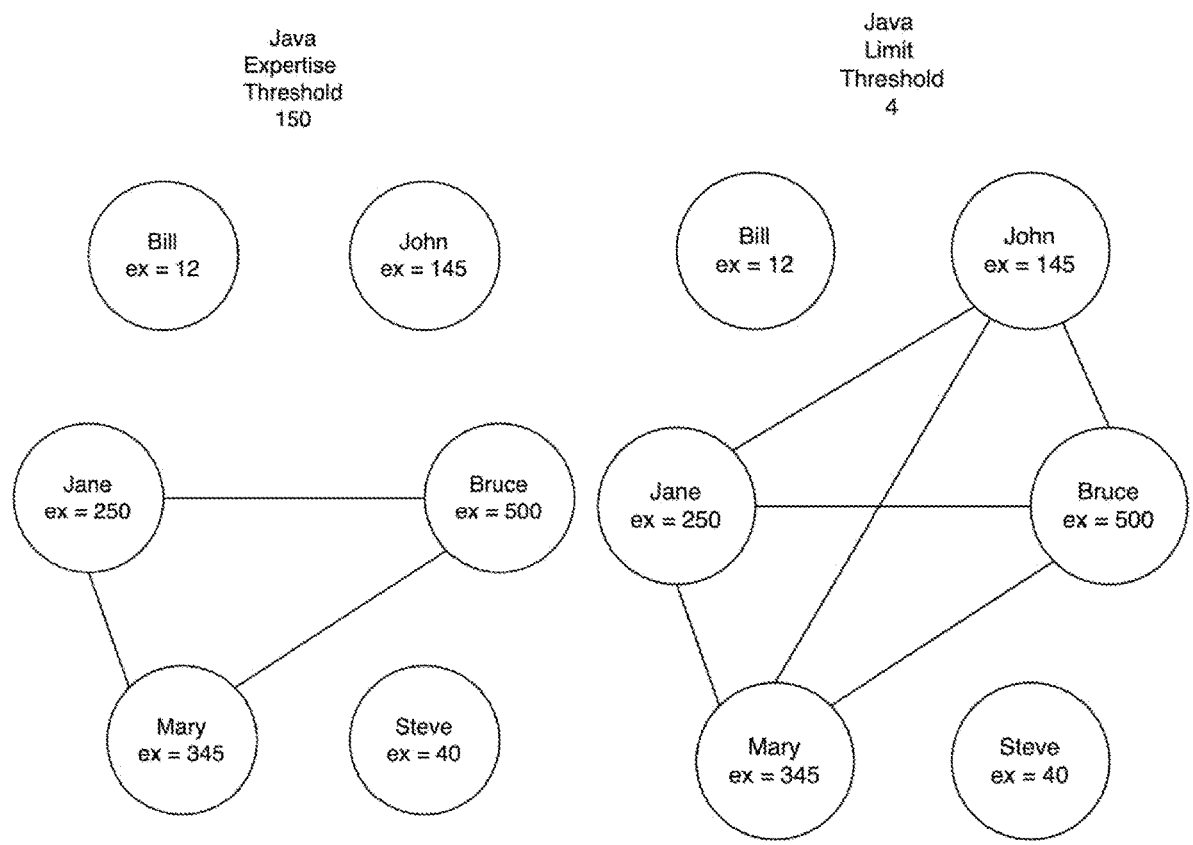
FIGS. 5A and 5B each depicts an example graph with weighted vertices based on Java expertise within an organization, according to an embodiment.

FIGS. 5A and 5B each represents an example graph with weighted vertices based on Java expertise within an organization. As shown in the example graph of FIG. 5A, each vertex of the graph includes a expertise score and the expertise threshold for the graph is set to 150. Thus, the individuals with an expertise score over 150 (e.g., the vertex with an expertise score of 250, the vertex with an expertise score of 245 and the vertex with an expertise score of 500) are fully interconnected, while the remaining vertices each having an expertise score less than 150 are not interconnected. As shown in the example graph of FIG. 5B, the four vertices with the highest expertise score are fully interconnected while the remaining vertices are not interconnected based on the expertise threshold of 4.

The graph can provide individuals with direct mappings to other individuals with a specific expertise in a dictionary based fashion. Therefore, for any given topic/keyword, the social capital assessment and recommendation model 105 can generate a mapping similar to FIG. 5A or FIG. 5B to identify influential individuals for the topic based on the interactions between different individuals in the organization. Such a graph with mappings to individuals with a specific expertise, influential individuals, and recommendations to interact can be transmitted from the social capital assessment and recommendation model 105 to the compute device 160 or server 170 where the graph, influential individual, and/or recommendations can be displayed.

Figure 6:
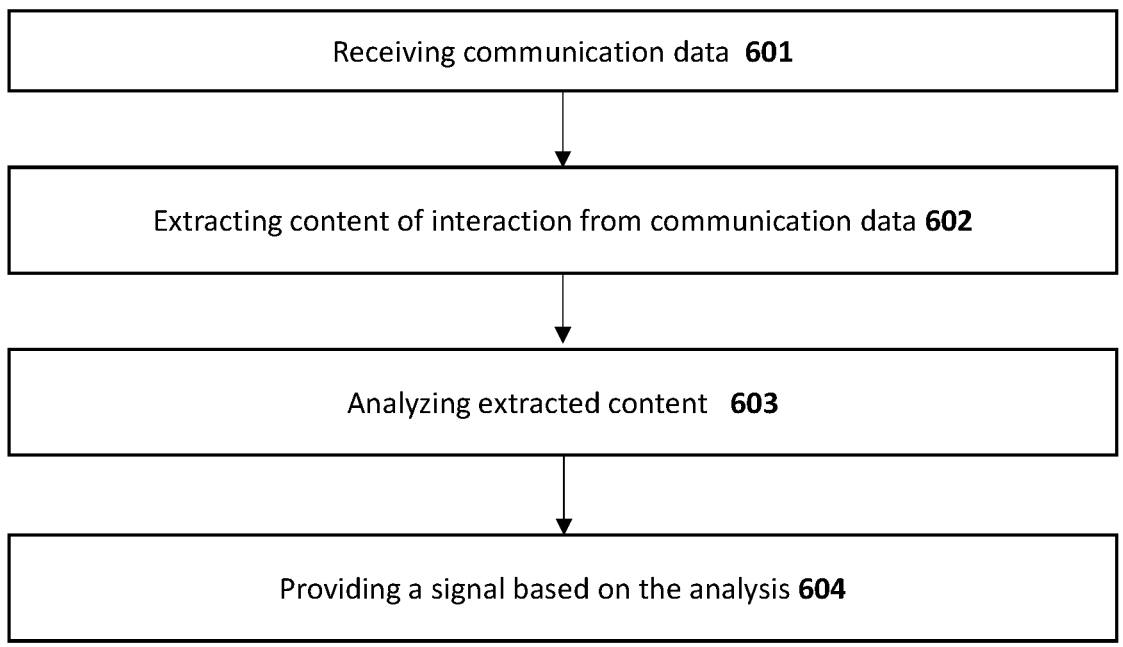
FIG. 6 is a flowchart depicting a method for providing recommendations and insights on social capital advancement, according to some embodiments.

FIG. 6 is a flowchart depicting a method for providing recommendations and insights on social capital advancement, according to some embodiments. At 601, the method includes receiving communication data (e.g., digital interactions). As discussed above, the communication data can be received from one or more communication platforms. Different communication platforms can send and receive communications data in different formats. For example, the communications data associated with an email communications platform can have a format that differs from the format for the communications data associated with a social media platform. The communication data can be received via one or more interfaces from the communication platform.

At 602, the method includes extracting content of interaction from the communication data. In some implementations, the extraction can be performed in one or more layers. For example, a first layer (e.g., a first layer of a model such as social capital assessment and recommendation model 105 in FIG. 1) can extract content from the communication data. For instance, the first layer can include one or more modules that extract content from the communication data. Each module can be compatible with a specific type of communication platform. In some implementations, after extracting the content, a second layer (e.g., a second layer of a model such as social capital assessment and recommendation model 105 in FIG. 1) can identify context from the extracted content. For example, the second layer can include a module to analyze the extracted content and identify an associated marker for the extracted content. Once the associated marker has been identified, the method can include modifying the extracted content with modifiers that are representative of the associated markers. The modified extracted content can be stored to train and/or update the model for providing recommendations and insights (e.g., social capital assessment and recommendation model 105 in FIG. 1). In some implementations, the modified extracted content can be analyzed to determine insights and provide recommendations.

At 603, the method includes analyzing the extracted content. In some implementations, analyzing the extracted content can include determining a nature of a relationship based on interaction between individuals and a shift in the nature of the relationship over time. In some implementations, analyzing the extracted content can include determining a professional weight for each individual in the organization. In some implementations, analyzing the extracted content can include determining skillsets, expertise, and/or knowledge of individuals within the organization.

In some embodiments, the method can include generating a map based on the analysis (e.g., based on a nature and/or shift in a relationship(s), and/or based on professional weight of individuals within the organization). The generated map can be used to assess a quality of social capital of individuals within the organization. The generated map can also be used to determine gaps in social capital of individuals. In some embodiments, the method can include generating a graph based on an area of expertise within the organization. The graph can include weighted vertices linking individuals to an expertise, knowledge, and/or skillset.

The graph can be used to determine whether work is being duplicated across the organization. In some embodiments, the graph can be used to determine thought leaders within specific areas of the organization. In some embodiments, the graph can be used to recommend interactions to individuals so as to advance the individual's career within the organization At 604, the method can include providing a signal based on the analysis. The signal can be transmitted to a compute device (e.g., compute device 160 in FIG. 1) and/or a server (e.g., server 170 in FIG. 1) where the signal can be used to display (can cause display of) a recommendation, assessment, and/or insight. In some embodiments, the transmitted signal can be used to display (can cause display of) a map depicting interactions between individuals, nature of interaction between individuals, and/or shift in the nature of interaction between the individuals. In some embodiments, the transmitted signal can be used to display (can cause display of) a professional weight for each individual in the organization. In some embodiments, the transmitted signal can display a graph depicting area of expertise within the organization.

It should be understood that the disclosed embodiments are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. Thus, it is to be understood that other embodiments can be used, and functional, logical, operational, organizational, structural and/or topological modifications may be made without departing from the scope of the disclosure. As such, all examples and/or embodiments are deemed to be non-limiting throughout this disclosure.

Some embodiments described herein relate to methods. It should be understood that such methods can be computer implemented methods (e.g., instructions stored in memory and executed on processors). Where methods described above indicate certain events occurring in certain order, the ordering of certain events can be modified. Additionally, certain of the events can be performed repeatedly, concurrently in a parallel process when possible, as well as performed sequentially as described above. Furthermore, certain embodiments can omit one or more described events.

All definitions, as defined and used herein, should be understood to control over dictionary definitions, definitions in documents incorporated by reference, and/or ordinary meanings of the defined terms.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages, packages, and software development tools.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The term "module" should be interpreted broadly to include any type of assembly and/or set of operatively-coupled electrical components associated with performing a specific function, and can include, for example, a memory, a processor, electrical traces, optical connectors, software (executing in hardware) and/or the like. An example of a module is a unit of software code (e.g., instructions) that performs a specific function(s) such as bridging communications.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A computer-implemented method, comprising:
receiving, via at least two communication platforms, communication data including an interaction between at least two individuals in an organization, each individual from the at least two individuals associated with an expertise score for a topic;
extracting, via a processor and using natural language processing, content related to the topic from the communication data to produce extracted content;
determining, via the processor, a frequency of interaction related to the topic between the at least two individuals based on the extracted content; and
generating, via the processor, a map representative of social interaction within the organization, the map including an indication of the frequency of interaction related to the topic; and
for each individual from the at least two individuals, determining, via the processor, a collaborator score associated with the topic based on that individual's frequency of the interaction related to the topic and the expertise score of the other individual from the at least two individuals in the interaction; and
providing, to a compute device, a signal representing the collaborator score for each individual from the at least two individuals.

2. The computer-implemented method of claim 1, wherein:
the at least two communication platforms include a first communication platform and a second communication platform, and
the communication data received from the first communication platform is in a format different from a format of the communication data received from the second communication platform.

3. The computer-implemented method of claim 1, wherein determining the type of interaction further includes identifying, via the processor, a presence of a representation of at least one visual in-line content within the extracted content.

4. The computer-implemented method of claim 1, wherein the collaborator score is a first collaborator score, the computer-implemented method further comprising, the computer-implemented method further comprising:
splitting, via the processor, the communication data into a plurality of temporal slices based on a timeframe during which each temporal slice of the plurality of temporal slices was received; and
extracting, via the processor and for each temporal slice from the plurality of temporal slices, a portion of the content including content related to the topic and content unrelated to the topic; and
determining, via the processor and for each temporal slice from the plurality of temporal slices, the first collaborator score representative of professional interaction related to the topic between the two individuals and a third collaborator score representative of personal interaction between the two individuals.

5. The computer-implemented method of claim 4, further comprising:
comparing the first collaborator score for a first temporal slice of the plurality of temporal slices with the first collaborator score for a second temporal slice of the plurality of temporal slices, the second temporal slice preceding the first temporal slice;
determining a first delta score based on the comparing; and
identifying a change in the professional interaction from the second temporal slice to the first temporal slice based on the first delta score.

6. The computer-implemented method of claim 5, further comprising:
comparing the second collaborator score for a first temporal slice of the plurality of temporal slices with the second collaborator score for a second temporal slice of the plurality of temporal slices, the second temporal slice preceding the first temporal slice;
determining a second delta score based on the comparing; and
identifying a change in the personal interaction from the second temporal slice to the first temporal slice based on the second delta score.

7. The computer-implemented method of claim 1, further comprising:
analyzing, via the processor, the extracted content;
assigning, via the processor, an identifier based on the analysis, the identifier being representative of the type of interaction;
associating, via the processor, the extracted content and the identifier; and
storing, in a database, the content with the associated identifier.

8. A non-transitory processor-readable medium storing code representing instructions to be executed by a processor of a first compute device, the code comprising code to cause the processor to:
receive a representation of a structure of an organization, the representation including an associated position and an associated rank of each employee relative to each remaining employee included in the representation of the structure of the organization;
for each employee included in the representation of the structure of the organization:

receive, via at least one communication platform, communication data including interactions between that employee and at least one other remaining employee included in the representation of the structure of the organization;

analyze the communication data based at least in part on the associated position and the associated rank of that employee and the associated position and the associated rank of the at least other remaining employee to determine a collaborator score for that employee with each remaining employee included in the representation of the structure of the organization based on a matrix representing a frequency of communication for that employee with each remaining employee included in the representation of the structure of the organization;

assess a quality of social network of that employee based on the analysis; and send, to a compute device of that employee, a signal representing a recommendation for interaction between that employee and at least one remaining employee included in the representation of the structure of the organization based on the quality of the social network of that employee.

9. The non-transitory processor-readable medium of claim 8, wherein the representation of the structure includes a hierarchical tree structure.

10. The non-transitory processor-readable medium of claim 8, wherein:
the representation of the structure includes a hierarchical tree structure, and
a portion of the hierarchical tree structure that includes at least two nodes collectively represents a team within the organization.

11. A non-transitory processor-readable medium storing code representing instructions to be executed by a processor of a first compute device, the code comprising code to cause the processor to:
receive a representation of a structure of an organization, the representation including an associated position and an associated rank of each employee relative to each remaining employee included in the representation of the structure of the organization;
receive, via at least one communication platform, communication data including interactions between that employee and at least one other remaining employee included in the representation of the structure of the organization;
generate a first matrix for the organization, the first matrix representing a frequency of communication for each employee with each remaining employee included in the representation of the structure of the organization;
generate a second matrix for the organization, the second matrix representing a frequency of communication for each employee with each remaining employee in a team included in the representation of the structure of the organization;
generate a third matrix for the organization based on the first matrix and the second matrix, the third matrix representing a relative frequency of communication between at least two teams of the organization;
assess a quality of social network for each employee included in the representation of the structure of the organization based on the third matrix; and
send, to a compute device, a signal representing a recommendation for interaction between a first employee in the representation of the structure of the organization and a second employee included in the representation of the structure of the organization based on the quality of the social network of the first employee.

12. The non-transitory processor-readable medium of claim 8, wherein the code includes instructions that further cause the processor to determine common collaborators within each team of the organization.

13. The non-transitory processor-readable medium of claim 8, wherein the code includes instructions that further cause the processor to determine common collaborators between different teams of the organization.

14. The non-transitory processor-readable medium of claim 8, wherein the code includes instructions that further cause the processor to:
assign a seniority score for each employee included in the representation of the structure of the organization based on the associated rank and the associated position of that employee;
determine a weighted score for each employee included in the representation of the structure of the organization based on the seniority score of that employee and the collaborator score of that employee, the quality of the social network of an employee included in the representation of the structure of the organization assessed based on the weighted score of that employee.

15. The non-transitory processor-readable medium of claim 8, wherein the code includes instructions that further cause the processor to provide recommendation for interactions between at least two teams included in the representation of the structure of the organization.

16. The computer-implemented method of claim 1, further comprising:
determining, via the processor, the topic within the content; and
identifying, via the processor, a professional expertise of a first individual from the at least two individuals based on the topic.

17. The computer-implemented method of claim 16, wherein identifying the professional expertise further includes determining, via the processor, the frequency of interaction between the first individual and a second individual from the at least two individuals.

18. The computer-implemented method of claim 16, wherein identifying the processional expertise further includes:
determining, via the processor, a plurality of interactions between the first individual and a second individual from the at least two individuals including the context relating to the professional expertise of the first individual; and
determining, via the processor, a temporal distance between a first interaction of the plurality of interactions and a second interaction of the plurality of interactions,
the identifying being based, at least in part, on the temporal distance.

19. The computer-implemented method of claim 16, wherein identifying the professional expertise includes identifying based at least in part on a weighted score representative of a knowledge of the first individual on the professional expertise.

20. The computer-implemented method of claim 16, further comprising generating a graph for the professional expertise within the organization, the graph including a representation of the first individual and the weighted score of the first individual, and the graph representing an influence of the first individual on the professional expertise in the organization.

\* \* \* \* \*

UNITED STATES PATENT AND TRADEMARK OFFICE
CERTIFICATE OF CORRECTION

PATENT NO. : 11,868,735 B1
APPLICATION NO. : 17/932156
DATED : January 9, 2024
INVENTOR(S) : Ryan Marples et al.

It is certified that error appears in the above-identified patent and that said Letters Patent is hereby corrected as shown below:

In the Claims

At Column 17, Claim number 1, Line number 43: delete "and";

At Column 17, Claim number 1, Line number 47: delete "and";

At Column 17, Claim number 3, Line number 67: delete "wherein determining the type of interaction";

At Column 17, Claim number 3, Line number 67: delete "includes" and insert --comprising--;

At Column 18, Claim number 4, Line number 6: delete "the";

At Column 18, Claim number 4, Line number 7: delete "computer-implemented method further comprising";

At Column 18, Claim number 6, Line number 37: delete "a" and insert --the--;

At Column 18, Claim number 6, Line number 39: delete "a" and insert --the--;

At Column 20, Claim number 18, Line number 46: delete "processional" and insert --professional--.

Signed and Sealed this
Fourteenth Day of May, 2024

Katherine Kelly Vidal
*Director of the United States Patent and Trademark Office*